US006016431A

United States Patent [19]

Holshouser

[11] Patent Number: 6,016,431

[45] Date of Patent: Jan. 18, 2000

[54] RADIOTELEPHONES WITH INTEGRATED MATCHING ANTENNA SYSTEMS

[75] Inventor: Howard Eugene Holshouser, Efland, N.C.

[73] Assignee: Ericsson Inc., Research Triangle Park, N.C.

[21] Appl. No.: 08/841,193

[22] Filed: Apr. 29, 1997

[51] Int. Cl.$^7$ ...................... H04Q 7/20

[52] U.S. Cl. ...................... 455/550; 455/90; 455/575

[58] Field of Search ...................... 455/90, 575, 550, 455/128, 129; 343/889, 875, 883, 901, 702

[56] References Cited

U.S. PATENT DOCUMENTS

| | | | |
|---|---|---|---|
| 4,725,845 | 2/1988 | Phillips | 343/702 |
| 4,748,450 | 5/1988 | Hines et al. | 343/820 |
| 5,166,695 | 11/1992 | Chan et al. | 343/702 |
| 5,374,937 | 12/1994 | Tsunekawa et al. . | |
| 5,583,519 | 12/1996 | Koike . | |
| 5,596,334 | 1/1997 | Boyee et al. | 343/702 |
| 5,659,889 | 8/1997 | Cockson | 455/575 |
| 5,739,792 | 4/1998 | Hassemer et al. | 343/702 |
| 5,754,141 | 5/1998 | Thompson et al. | 455/575 |
| 5,874,921 | 2/1999 | Doherty et al. | 343/702 |

FOREIGN PATENT DOCUMENTS

| | | | |
|---|---|---|---|
| 0 613 207 A1 | 8/1994 | European Pat. Off. | H01Q 1/24 |
| 0 634 806 A1 | 1/1995 | European Pat. Off. | H01Q 1/24 |
| 2 213 998 | 8/1989 | United Kingdom | H01Q 1/10 |
| 2 253 949 | 9/1992 | United Kingdom | H01Q 1/08 |
| WO 98/12772 | 3/1998 | WIPO | H01A 1/24 |

OTHER PUBLICATIONS

PCT International Search Report, PCT/US98/08131, Jul. 24, 1998.

*Primary Examiner*—Edward F. Urban
*Assistant Examiner*—Tilahun Gesesse
*Attorney, Agent, or Firm*—Myers Bigel Sibley & Sajovec, P.A.

[57] ABSTRACT

Radiotelephones configured with integrated matching circuit components in the housing and antenna are disclosed. The present invention configures the antenna and the associated housing receiving passage to define a capacitor and inductor to match the differing impedances generated by retractable top load antennas (retracted and extended impedances) without requiring a separate switching circuit and wiping contacts.

40 Claims, 5 Drawing Sheets

FIG. 1A
PRIOR ART
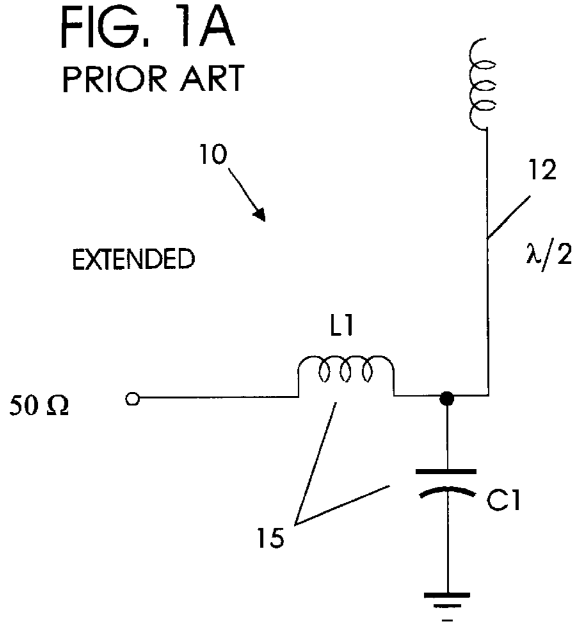
FIG. 1B
PRIOR ART
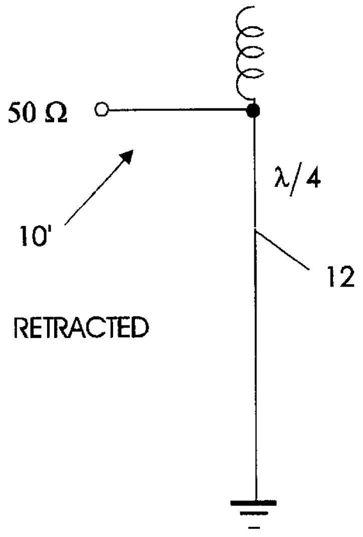
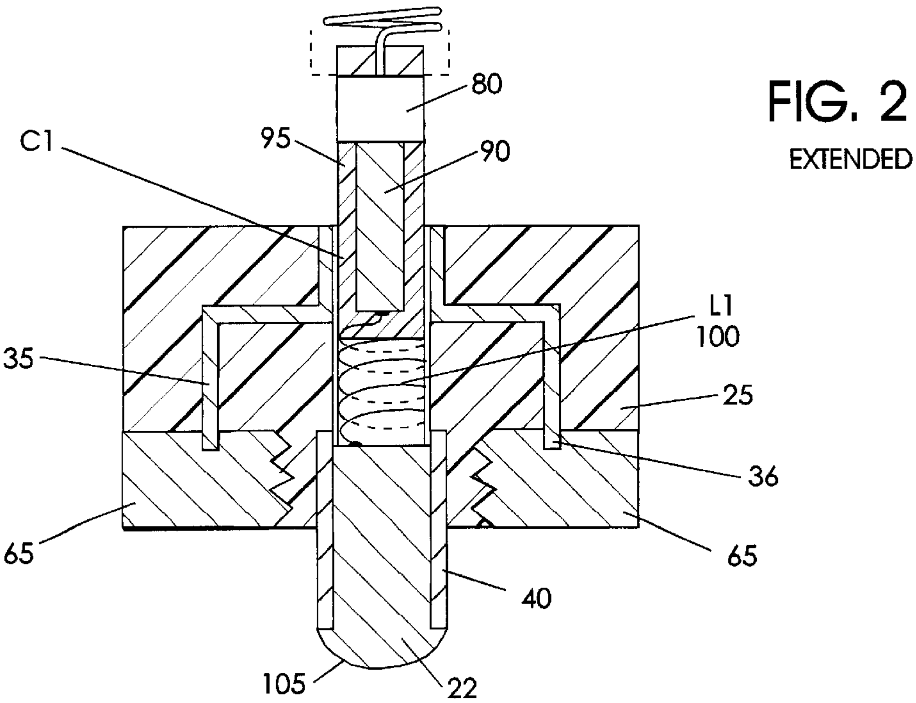
FIG. 2
EXTENDED FIG. 3
RETRACTED
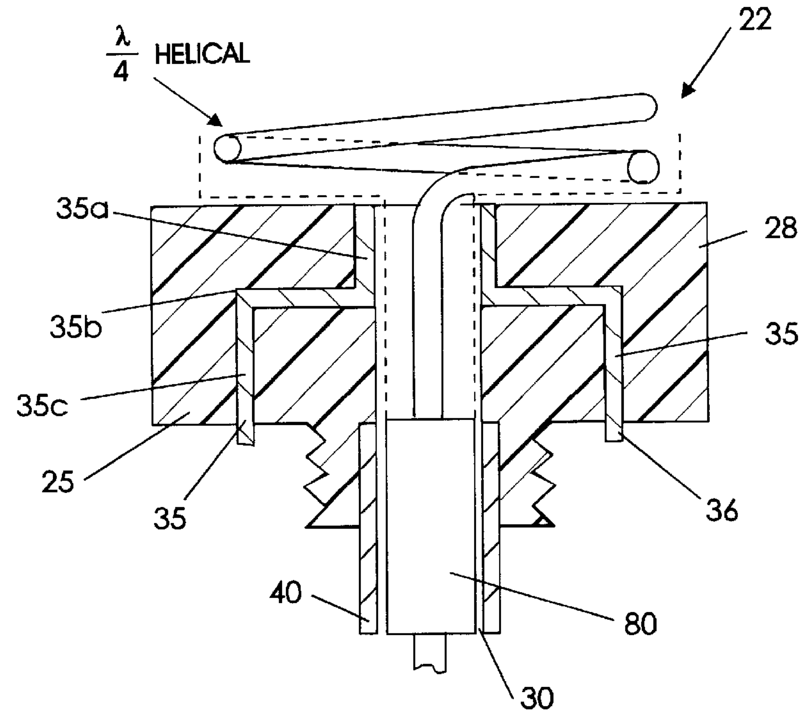
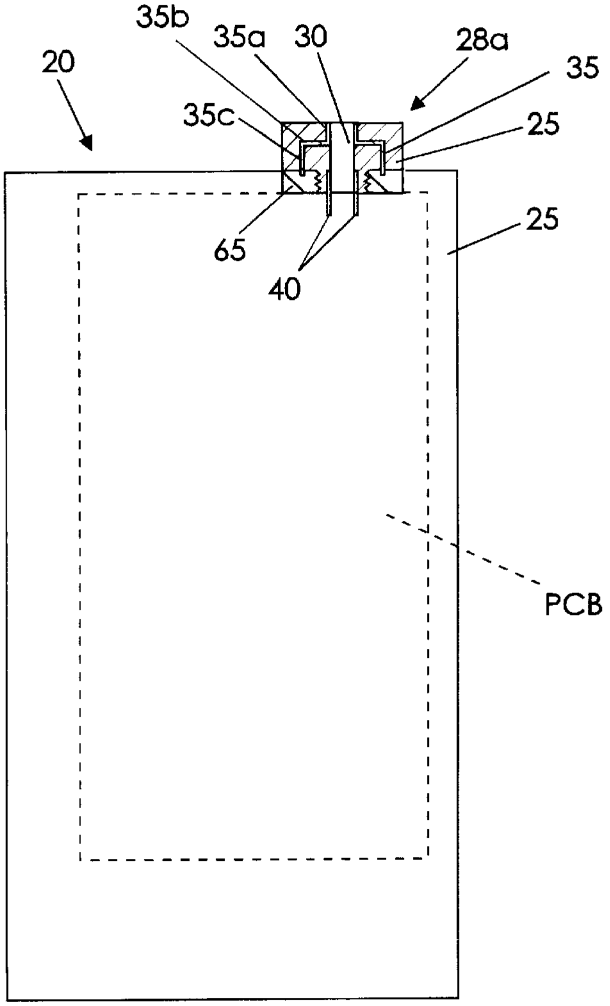
FIG. 4

RADIOTELEPHONES WITH INTEGRATED MATCHING ANTENNA SYSTEMS

FIELD OF THE INVENTION

The present invention relates to radiotelephones, and more particularly relates to matched systems for retractable antennas in radiotelephones.

BACKGROUND OF THE INVENTION

Many radiotelephones employ retractable antennas, i.e., antennas which are extendable and retractable out of the radiotelephone housing. The retractable antennas are electrically connected to a signal processing circuit positioned on an internally disposed printed circuit board. In order to optimally operate, the signal processing circuit and the antenna should be interconnected such that the respective impedances are substantially "matched", i.e., electrically tuned to filter out or compensate for undesired antenna impedance components to provide a 50 Ohm impedance value at the circuit feed. Unfortunately, complicating such a matching system, a retractable antenna by its very nature has dynamic components, i.e., components which move or translate with respect to the housing and the printed circuit board and as such does not generally have a single impedance value. Instead, the retractable antenna typically generates largely different impedance values when in an extended versus a retracted position. Therefore, it is preferred that the impedance matching system alter the antenna's impedance to properly match the terminal's impedance both when the antenna is retracted and extended.

The physical configuration of the matching network is further complicated by the miniaturization of the radiotelephone and the internally disposed printed circuit board. Many of the more popular hand-held telephones are undergoing miniaturization. Indeed, many of the contemporary models are only 11–12 centimeters in length. Because the printed circuit board is disposed inside the radiotelephone, its size is also shrinking, corresponding to the miniaturization of the portable radiotelephone. Unfortunately, as the printed circuit board decreases in size, the amount of space which is available to support desired operational and performance parameters of the radiotelephone is generally correspondingly reduced. Therefore, it is desirable to efficiently and effectively utilize the limited space in the radiotelephone and on the printed circuit board.

This miniaturization can also create complex mechanical and electrical connections with other components such as the outwardly extending retractable antenna which must generally interconnect with the housing for mechanical support, and, as discussed above, to an impedance matching system operably associated with the printed circuit board in order for the signal to be processed.

Referring to FIGS. 1A and 1B, desired equivalent circuits 10, 10' are illustrated for extended and retracted antenna positions, respectively. As shown, in FIG. 1A, in the extended position the antenna rod 12 operates with a half-wave ($\lambda/2$) load. In this situation, the associated impedance may rise as high as 600 Ohms. In contrast, in the retracted position, as shown in FIG. 1B, the antenna rod 12 operates with a quarter-wave ($\lambda/4$) load with an impedance typically near 50 Ohms. Therefore, when the antenna is in the extended position an L-C matching circuit 15 may be needed.

In the past, conventional portable radiotelephones have used a variety of antenna connections to match the impedance in the antenna to the housing and the printed circuit board. For example, U.S. Pat. No. 5,374,937 to Tsunekawa et al. proposes downwardly spaced-apart contacts or terminals on the printed circuit board in the radiotelephone housing which act to engage with or short out of the associated matching network. Unfortunately and disadvantageously, this type of switching connection can employ a number of discrete switching components such as wiping contacts and additionally may use an undesirable amount of space on the printed circuit board. Further, this configuration can limit the operational bandwidth of the radiotelephone.

One alternative is described in a co-pending patent application, entitled "Radiotelephones with Antenna Matching Switching System Configurations" by Gerard J. Hayes and Howard E. Holshouser, identified by Attorney Docket No. 8194-73. This system employs transversely spaced-apart circuit and antenna contacts to reduce the amount of space on the printed circuit board needed to operate the matching system. However, the system employs a number of discrete components in the switching assembly and interconnection of the antenna to the circuit board of the device.

OBJECTS AND SUMMARY OF THE INVENTION

It is therefore a first object of the present invention to provide matching systems which reduce the number of switching contacts and discrete components used to generate a retractable antenna matching system.

It is another object of the present invention to employ a top loaded half wave monopole retractable antenna in a way which reduces the number of discrete components used to match the antenna's associated impedances.

It is yet another object of the present invention to reduce the number of wiping contacts and separate switches and to reduce the amount of printed circuit board space necessary to operate a retractable antenna matching system.

It is a further object of the present invention to increase the operational bandwidth of the radiotelephone.

It is yet another object of the present invention to decrease the number of discrete components needed to operate a matching system.

It is a still further object of the present invention to provide an economical and easy to manufacture antenna and housing configuration which incorporates a radiotelephone antenna matching system.

These and other objects are satisfied by the present invention by integrating one or more of the operational elements of a matching system into the physical configuration of the radiotelephone housing and antenna. A first aspect of the invention includes a radiotelephone with a housing and antenna configured to define one or more matching circuit components. The radiotelephone comprises a radiotelephone housing with opposing first and second ends. The first end includes a passage of a predetermined length. The passage includes at least one conducting portion thereon. The radiotelephone also includes a retractable antenna with opposing first and second ends which define a central axis through the center thereof. The antenna is slidably extendable through the passage about the central axis between a first extended position and a second retracted position. When the antenna is in the first extended position, the housing passage and the antenna define a matching circuit therebetween.

In one embodiment, the housing and the antenna are configured such that the antenna includes an inductor positioned thereon and the antenna and the housing together define a coaxial capacitor therebetween. Therefore, advantageously, when the antenna is extended the antenna and housing define an integral matching L-C network corresponding to the increased impedance generated by the antenna in that position.

In a preferred embodiment of the present invention, a radiotelephone, similar to the one described above, includes a retractable antenna rod which includes an outwardly extending electrical top loaded rod element configured on the first end and a first antenna conductive contact electrically connected to the top rod end. The antenna also includes an inwardly extending center conductive element with first and second ends, the first end is electrically connected to the first antenna contact. A dielectric layer is disposed around the center conductive element and defines an insulating shell thereabout. The antenna also includes a matching inductor electrically connected to the center conductive element second end and a second longitudinally extending antenna conductive contact disposed on the second end of the antenna.

Correspondingly, the radiotelephone housing includes a passage formed therethrough configured to receive the retractable antenna therein. The passage includes an inwardly extending surface. The housing comprises a ground clip having first, second, and third segments. The first segment is disposed on the housing passage surface and has opposing first and second ends and extends a predetermined distance into the housing passage. The second segment extends normal to the central axis and has opposing first and second ends such that the first end is defined by the first segment second end. The third segment extends substantially parallel to the central axis and has opposing first and second ends such that the first end is defined by the second segment second end.

The housing also includes a grounding insert disposed away from the passage such that the insert electrically connects with the third segment second end. The housing also includes a downwardly extending electrical contact feed disposed on the outer surface of the housing passage longitudinally spaced-apart a predetermined distance from the ground clip first segment. The radiotelephone also includes a radiotelephone printed circuit board disposed in the housing adjacent the antenna. The printed circuit board is configured to receive an electrical signal from the antenna.

In operation, when the antenna is extended the antenna and the housing form integrated inductive and capacitive matching components. The integrated matching capacitive component is defined by the antenna center conductive element, the dielectric shell, and the ground clip. The integrated matching inductive component is defined by the antenna matching inductor. Advantageously, this matching system does not require separate wiping contacts or discrete switching components.

An additional aspect of the present invention is a matching system with an integral capacitor. In operation, the antenna conductive portions and the housing conductive portions are aligned to define an integrated capacitor when the antenna is extended. Preferably, the radiotelephone antenna includes a longitudinally extending central conductive element surrounded by an insulating dielectric layer. The central conductive element is connected with the electrical load of the antenna. The housing further includes a cylindrical ground clip in electrical contact with a portion of the passage. Thus, when the antenna is extended, the integrated capacitor is defined by the alignment of the antenna center element and the ground clip.

The foregoing and other objects and aspects of the present invention are explained in detail in the specification set forth below.

BRIEF DESCRIPTION OF THE DRAWINGS

FIG. 1A is a schematic representation of an equivalent circuit of a conventional extended half-wave antenna and an associated L-C matching circuit.

FIG. 1B is a schematic representation of the equivalent circuit of the antenna of FIG. 1A, but in a retracted position, shown as a quarter-wave stub.

FIG. 2 is a partial section view of one embodiment of a matching switching system according to the present invention, with the antenna in an extended position.

FIG. 3 is an enlarged fragmentary view of the matching system illustrated in FIG. 2, but with the antenna in a retracted position.

FIG. 4 is a cutaway view of a radiotelephone with a preferred embodiment of a matching system according to the present invention.

DESCRIPTION OF PREFERRED EMBODIMENTS

The present invention will now be described more fully hereinafter with reference to the accompanying figures, in which preferred embodiments of the invention are shown. This invention may, however, be embodied in many different forms and should not be construed as limited to the embodiments set forth herein. Like numbers refer to like elements throughout.

Figure 6:
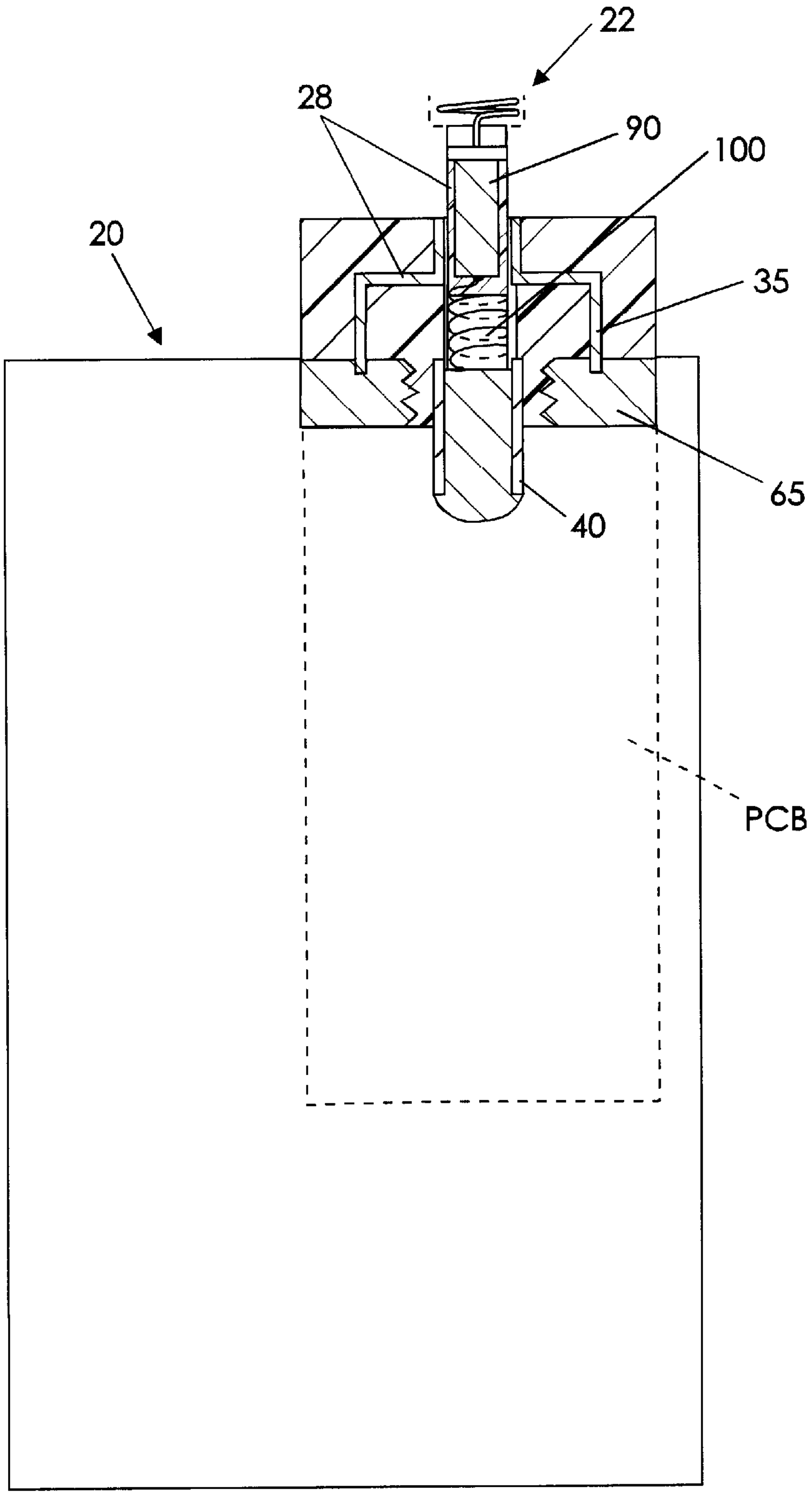
FIG. 6 is an enlarged assembly view of one embodiment of a radiotelephone and antenna of the present invention.

Generally described, as illustrated in FIGS. 4 and 6, the present invention is directed towards radiotelephones 20 with retractable antennas 22 and housings 25. Preferably, the radiotelephone 20 employs a top load electrical antenna rod 23 that operates as a half wave in the extended position and a quarter wave stub (helical spiral) in the retracted position. Of course, the invention is not limited to this antenna load as alternative antenna configurations can also be employed in the instant invention. For example, an antenna load which has an integer multiple of a half-wave length, or a coil, disc or other type antenna load element.

The radiotelephone housing 25 and antenna 22 are configured to provide one or more matching circuit components, i.e., a matching system 28 which has different circuit paths and associated impedances corresponding to predetermined positions of the translating antenna 22, i.e., corresponding to the retracted or extended position of the antenna 22 relative to the radiotelephone housing 25. It will be appreciated that when the antenna 22 is extended, a major portion of the body is outside of the housing 30; in contrast, when the antenna 22 is retracted, a major portion of the antenna 22 is positioned inside the radiotelephone housing 25. In operation, the antenna 22 extends in and out of the housing passage 30 (FIGS. 2 and 3) along the central axis 50 and engages with the housing 25 such that different circuit paths are defined and activated by the position and alignment of the antenna 22 within the housing 25 corresponding to the retraction and extension of the antenna as will be discussed in more detail hereinbelow.

Preferably, the electrical length of the antenna 22 (typically defined by the top load element 23 and the length of the linear rod) is predetermined. Further preferably, the electrical length of the antenna 22 is configured to provide a half wavelength or an integer multiple of a half wavelength so that the antenna 22 resonates with the operation frequency.

The matching system 28 includes matably configured housing 28*a* and antenna 28*b* components. The housing portion of the matching system 28*a* is as shown in FIG. 4. In a preferred embodiment, the housing portion of the matching system 28*a* is positioned on the top surface of the radiotelephone 20. Preferably, the housing portion of the matching system 28*a* is formed from a non-conducting substrate material. The housing 25 includes a passage 30 formed therein which 30 extends a predetermined distance into the housing 25. The housing portion of the matching system 28*a* also includes a conducting ground clip 35 and spaced-apart conducting contact 40. The contact 40 is the 50 Ohm feed for the antenna 22. The contact 40 is operably associated with the printed circuit board 45 in the radiotelephone.

As shown in FIG. 3, the ground clip 35 is preferably configured with first, second, and third segments 35*a*, 35*b*, 35*c*. The ground clip 35 is positioned in the housing 25 such that the first segment 35*a* is disposed substantially flush with the passage 30. Preferably, the first segment 35*a* is a continuous conductive cylindrically shaped body having a constant inner diameter therearound. This configuration provides an outer plate of a matching capacitor as will be discussed further below. The second segment 35*b* extends normal to (transversely away from) the passage 30. The third segment 35*c* extends substantially parallel to the first segment 35*a*. The downwardly disposed end of the third segment 35*c* extends out of the housing 25 such that it contacts a grounded insert 65 positioned in the radiotelephone.

The conducting contact 40 is preferably positioned to be substantially flush with the contour of the passage 30. In a preferred embodiment, as illustrated in FIG. 4, the contact 40 is positioned a predetermined distance into the housing passage 30 such that, unassembled, it is electrically and physically separated from the ground clip 35 and the ground insert 65.

As described above, the housing 25 and the antenna 22 are matably configured so that activation of the matching circuitry 25 occurs with the physical retraction and extension of the antenna 22. As illustrated, this configuration advantageously reduces the amount of space on the printed circuit board needed or dedicated to activate the corresponding matching circuit components.

In operation, the antenna 22 extends in and out of the housing opening 40 (FIGS. 4, 5, and 11) along the central axis 50. As described above, preferably, the electrical length of the antenna 22 (defined by the top load element 23 and the length of the linear rod 22) is predetermined. Further preferably, as described above, the electrical length of the antenna 22 is configured to provide a half wavelength or an integer multiple of a half wavelength so that the antenna 22 resonates with the operation frequency.

Figure 5:
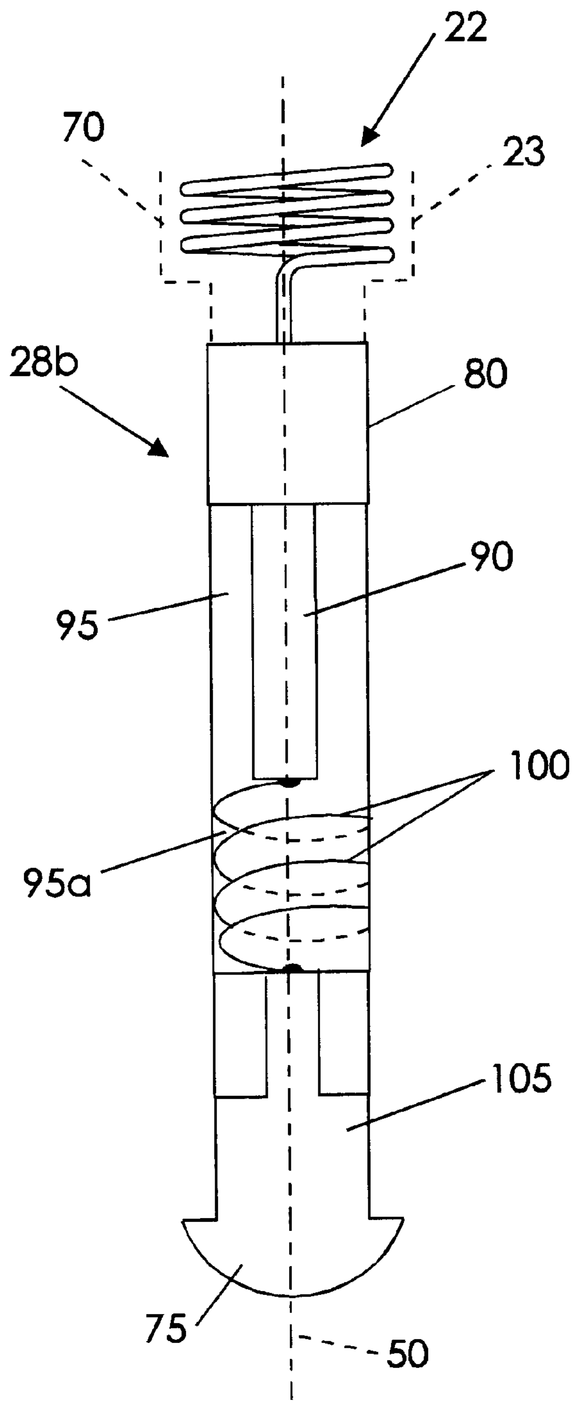
FIG. 5 is a schematic representation of one embodiment of an antenna according to the present invention.

FIG. 2 shows the antenna 22 in the extended position and FIG. 3 shows the antenna 22 in the retracted position. As illustrated in FIG. 5, the antenna 22 includes opposing first and second ends 70, 75 and defines a central axis 50 through the center thereof. As illustrated in FIGS. 2 and 3, the first end 70 extends out of the housing 25 and includes the top load antenna element 23, such as a top load monopole. The antenna 22 also includes a first conducting contact portion 80 positioned below the antenna element 23. The conducting contact 80 is electrically connected to the antenna element 23. Preferably, the antenna 22 next includes in longitudinal serial order, a center conductive element 90 surrounded by a non-conductive (insulating) dielectric shell 95, and an inductor 100. The second end 75 includes a second conducting portion 105 which remains within the housing 30 irrespective of the extension of the antenna 22. The center conductive element 90, the inductor 100, and the second conducting portion 105 are in electrical communication with the antenna element 23, preferably each component electrically contacting the adjacently positioned conducting component.

As illustrated in FIG. 2, when the antenna is extended, the matching network 28 preferably includes a matching inductor (L1) and a matching capacitor (C1). In a preferred embodiment, the matching capacitor (C1) is formed by the position of the antenna 28*b* within the housing passage 28*a*, i.e., by the antenna rod 22, the ground clip 35, the center conductor 90 and dielectric shell 95. The capacitor is formed to provide about a ½–1 picofarad capacitance. The first segment of the ground clip 35*a* forms the outer plate of the capacitor and electrically contacts the ground insert 65. The matching inductor (L1) is formed by an inductor 100 that is wound over dielectric material 95*a* of the antenna rod. This inductor 100 can be provided in any number of ways, including but not limited to, physically winding, selectively etching, or plating and then machining. An exemplary winding pattern includes a 50 mil wire wrapped 3–4 turns to provide about a 15 nanohenry inductor. The center conductor and or antenna rod conducting portions are preferably formed from a Ni—Ti alloy.

As illustrated in FIG. 2, when the antenna 22 is extended, the antenna second end conducting portion 105 contacts the housing conducting portion 40 (the 50 Ohm feed for the antenna) and the antenna rod thereby defining an extended signal path therebetween. The antenna second conducting portion 105 also electrically contacts the inductor 100 which electrically connects with the center conductive element 90 which electrically contacts the helical spiral 23 at the top of the antenna 22.

In contrast, as illustrated by FIG. 3, when retracted, the antenna first conducting contact 80 connects to the helical spiral 23 (quarter wave) at the top of the antenna rod. In this position, the antenna first conducting portion 80 also connects to the housing conducting contacts 40 creating a retracted signal path therebetween. Further, when retracted, the antenna second conducting portion 105 may be grounded in the radiotelephone directly to shift the quarter wave resonance out of the desired pass band, or alternatively, grounded through a capacitor to tune out the inductor L1. Nonetheless, in operation, a 50 Ohm feed impedance will be realized at the housing conducting contact 40.

As shown, the matching network or system 28 provides a 50 Ohm circuit contact via the housing conducting portion 40. This feed is electrically connected with the printed circuit board or other substrate which processes the radiotelephone signal.

As shown in FIG. 2, to activate the matching network or components thereof when extended, the antenna end portion 105 contacts the housing contact 40 to activate the associated matching components L1, C1. In contrast, when retracted, the antenna conducting contact portion 105 is preferably grounded. The antenna first conducting contact electrically connects with the housing contact 40 by positioning the retracted antenna 22 therebetween. Thus, the interconnection of the contact 40 with the first or second conducting portion 80, 105 of the antenna 22 provides different signal paths to activate selected matching circuit components. Preferably, the matching circuit includes both an inductor and a capacitor, but the invention is not limited thereto. Indeed, the integrated system can alternatively be configured to selectively match either the impedance of the inductive or the capacitive portion of the signal. Resistive components may also be added, either external to, or integral with, the capacitive and inductive components.

Figure 7:
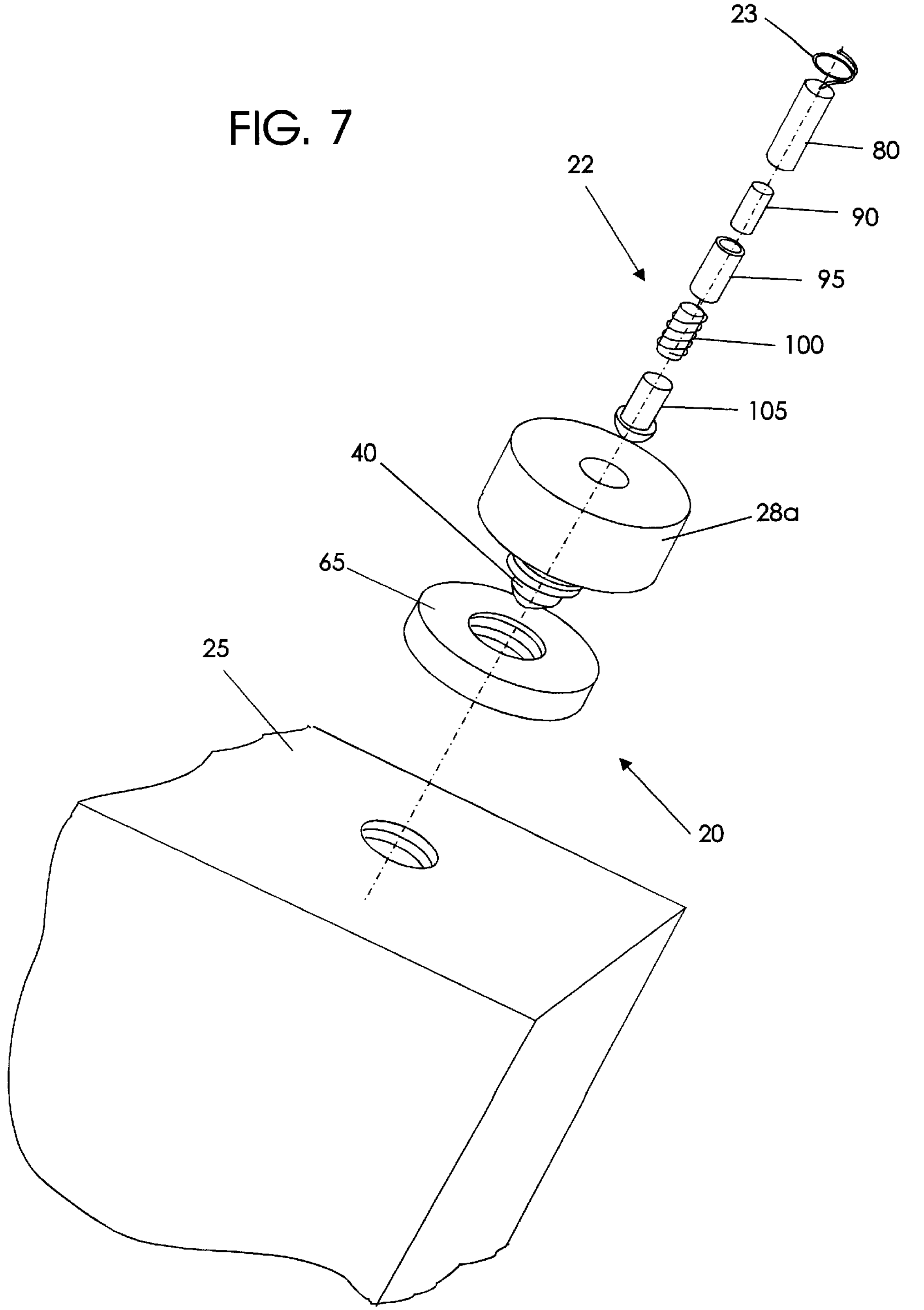
FIG. 7 is an enlarged fragmentary exploded view of a preferred embodiment of an antenna rod and housing of the present invention.

FIG. 7 illustrates an exploded view of the components used in a preferred embodiment of the instant invention. As shown the antenna 22 components are cylindrically shaped to form a substantially continuous constant outer diameter over the length of the antenna. The non-conducting housing passage 30 and the conducting ground insert 36 are also cylindrically shaped. Similarly, the conducting ground clip 35 is a cylindrical body and includes a circumferentially extending center segment component, i.e., is a stepped body having two longitudinally diameters and a center intermediate thereof. The conducting housing contact is a stationary ferrule 40 positioned in the housing passage 30 and having a downwardly extending length such that it extends beyond the ground insert 36 when assembled theretogether.

As will be appreciated by those of skill in the art, the above described aspects of the present invention may be provided by hardware, software, or a combination of the above. Thus while the various components have been described as integrated elements, one or more may, in practice, be implemented by a microcontroller including input and output ports running software code, by custom or hybrid chips, by discrete components or by a combination of the above. For example, one or more components of the matching circuit 28, can be a implemented as a programmable controller device or as a separate discrete component. Of course, discrete circuit components and discrete matching circuits corresponding to the impedance requirements of the antenna can be employed with the integrated housing and antenna and can be mounted separately or integrated into a printed circuit board. Similarly, the term "printed circuit board" is meant to include any microelectronics packaging substrate.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clause are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A radiotelephone, comprising:

a radiotelephone housing having opposing first and second ends, said first end including a passage having a predetermined length wherein said passage includes at least one conducting portion thereon;

a conductive shell having first and second segments positioned in a top portion of said housing, wherein said first segment is cylindrical and is positioned proximate to said passage and said second segment is positioned such that it is spatially separated a further distance away from said passage relative to said first cylindrical segment; and a retractable antenna having opposing first and second ends and defining a central axis through the center thereof, said antenna slidably extendable through said passage about said central axis between a first extended position and a second retracted position;

wherein when said antenna is in said first extended position said antenna transversely aligns with said conductive shell to define a coaxial capacitor therebetween.

2. A radiotelephone according to claim 1, wherein said passage is compactly configured to longitudinally extend about a top portion of said housing and wherein said passage includes an inner wall which is sized and configured to contact said antenna, and wherein said passage at least one conducting portion comprises first and second longitudinally spaced-apart portions defining different portions of said passage inner wall, a first ground and second signal conducting portion, and wherein said first ground conducting portion corresponds to said conductive shell first segment.

3. A radiotelephone according to claim 2, wherein said antenna includes an inductor element positioned thereon.

4. A radiotelephone according to claim 3, wherein said inductor element comprises windings disposed over a non-conductive substrate.

5. A radiotelephone according to claim 2, wherein said antenna includes in longitudinal serial order, a top load element, a first conductor, a center conductor having a dielectric layer defining an insulating shell therearound, an inductor, and a second conductor, each in electrical communication with said top load element.

6. A radiotelephone according to claim 5, wherein said housing second conducting portion is configured as a cylindrical body having an opening formed therethrough for receiving said antenna.

7. A radiotelephone according to claim 6, wherein when antenna is extended said antenna second conductor and said housing cylindrical body are engaged to define a signal path.

8. A radiotelephone according to claim 7, wherein when said antenna is retracted said antenna first conductor and said housing cylindrical body are engaged to define a signal path.

9. A radiotelephone according to claim 2, wherein said antenna and housing are configured to provide a first matching impedance when said antenna is extended and a second matching impedance when said antenna is retracted.

10. A radiotelephone according to claim 2, wherein when said antenna is extended, said antenna and said housing passage provides a matching circuit having a capacitor and an inductor said capacitor having above about a 0.5 picofarad capacitance and said inductor having about a 15 nanohenry inductance.

11. A radiotelephone according to claim 1, wherein said housing passage has a longitudinally extending inner wall, and wherein said housing passage first conducting portion is defined by said conductive shell first cylindrical segment, said conductive shell first cylindrical segment extending circumferentially around said passage to define a top portion of said housing passage inner wall and having a first length, and wherein said second segment is transversely spaced-apart from said passage inner wall.

12. A radiotelephone according to claim 11, wherein said housing includes a ground insert disposed at a top portion thereof, and wherein said conductive shell second segment is configured to electrically contact with said ground insert.

13. A radiotelephone according to claim 11 wherein said conductive shell includes a laterally extending center segment intermediate of said first and second segments substantially normal to said central axis, and wherein said first and second segments extend substantially parallel to said central axis.

14. A radiotelephone, comprising:

a retractable antenna rod having opposing first and second ends and defining a central axis through the center thereof, said antenna rod slidably extendable about said central axis between a first extended position and a second retracted position, wherein said antenna has a first impedance in said first position and a second impedance less than said first impedance in said second position, said antenna comprising;

an outwardly extending electrical top loaded rod element configured on said first end;

a first antenna conductive contact electrically connected to said top rod end;

an inwardly extending center conductive element having first and second ends, wherein said first end is electrically connected to said first antenna contact;

a dielectric layer around said center conductive element to define an insulating shell thereabout;

a matching inductor electrically connected to said center conductive element second end; and a second longitudinally extending antenna conductive contact disposed on the second end of said antenna;

a radiotelephone housing including a passage formed therethrough configured to receive said retractable antenna therein, said passage including an inwardly extending surface, said housing comprising;

a ground clip having first, second, and third segments, said first segment disposed in said housing on said housing passage surface having opposing first and second ends and extending a predetermined distance into said housing, said second segment extending normal to said central axis and has opposing first and second ends such that said first end is defined by said first segment second end, said third segment extending substantially parallel to said central axis and has opposing first and second ends such that said first end is defined by said second segment second end;

a grounding insert disposed in said housing away from said passage such that said insert electrically connects with said third segment second end;

a downwardly extending electrical contact feed disposed on the outer surface of said housing passage longitudinally spaced-apart a predetermined distance from said ground clip first segment; and a radiotelephone printed circuit board disposed in said housing adjacent said antenna, said printed circuit board configured to receive an electrical signal from said antenna, wherein when said antenna is extended said antenna and said housing form integrated inductive and capacitive matching components, said integrated matching capacitive component being defined by said antenna center conductive element, said dielectric shell, and said ground clip, and said integrated matching inductive component being defined by said antenna matching inductor.

15. A radiotelephone according to claim 14, wherein when said antenna is extended said matching circuit is electrically connected to said housing contact feed via said antenna second contact portion.

16. A radiotelephone according to claim 14, said capacitive component is a coaxial capacitor having an outer plate formed by said ground clip.

17. A radiotelephone according to claim 14, wherein when said antenna is in the retracted position said antenna first contact portion engages with said housing contact feed providing a 50 Ohm feed to said printed circuit board.

18. A radiotelephone according to claim 14, wherein in the retracted position the second end of said antenna rod is grounded to said radiotelephone to electrically disconnect said inductive component in said antenna.

19. A radiotelephone according to claim 14, wherein said inductive and capacitive components are configured in said housing and antenna such that they are electrically disconnected from said feed contact when said antenna is retracted.

20. A radiotelephone according to claim 14, wherein said antenna includes a substantially constant longitudinally extending outer surface such that said antenna can be easily slidably extended and retracted through the opening formed in said housing.

21. A radiotelephone according to claim 14, wherein said antenna top rod end, said first contact, said dielectric shell, and said second contact portion are longitudinally serially aligned along the central axis.

22. A radiotelephone according to claim 14, wherein said second antenna contact has a first longitudinal length and an end configured to provide a maximum extension of said antenna relative to said housing, and wherein said housing electrical feed has a second longitudinal length.

23. A radiotelephone according to claim 22, wherein said first length is substantially equal to said second length.

24. A radiotelephone according to claim 23, wherein said antenna first contact portion has a third longitudinal length substantially equal to said housing feed second length.

25. A radiotelephone according to claim 24, wherein said ground clip first segment has a fourth length less than said housing feed second length.

26. A radiotelephone according to claim 14, wherein said matching inductor is disposed over a base substrate.

27. A radiotelephone according to claim 14, wherein said matching inductor comprises a predetermined conductive winding pattern on an exposed surface of a dielectric base material.

28. A radiotelephone, comprising:

a retractable antenna having opposing first and second ends and defining a central axis through the center thereof, said antenna including a conducting circuit contact portion on said second end, said antenna slidably extendable about said central axis between a first extended position and a second retracted position, wherein said antenna has a first impedance in said first position and a second impedance less than said first impedance in said second position;

a radiotelephone housing configured with an antenna receiving passage positioned at a top portion thereof, said passage configured and sized to receive said retractable antenna therein, wherein during operation said antenna first end is extendable out of said housing passage and said antenna second end is non-extendable out of said housing passage;

a ground insert mounted to said radiotelephone housing;

a ground clip having first and second longitudinally extending segments mounted to said radiotelephone housing, wherein said first segment is cylindrical and is positioned proximate to said antenna receiving passage and wherein said second segment is positioned in said radiotelephone housing to be spatially separated a distance from said receiving passage and to be in electrical communication with said ground insert:

a radiotelephone printed circuit board disposed in said radiotelephone housing, said printed circuit board operably associated with said antenna; and an integrated matching circuit activated when said antenna is in the extended position, said integrated matching circuit including a first inductor integrally formed on said antenna and a coaxial capacitor having opposing inner and outer plates and a center insulator defined by the transverse alignment of a portion of said antenna with said ground clip, wherein said outer plate is defined by said ground clip first segment and said inner plate and said center insulator are defined by a portion of said antenna.

29. A radiotelephone according to claim 28, said antenna portion which defines said inner plate and center insulator comprises a longitudinally extending central cylindrical conductive element surrounded by an insulating dielectric layer, said central conductive element electrically connected with the electrical load of said antenna and spatially positioned on said antenna relative to said opposing ends to transversely align with said around clip when said antenna is extended.

30. A radiotelephone according to claim 29, wherein said ground clip first and second longitudinally extending segments are coaxial and include cylindrical walls which extend a radial distance away from said central axis, said second longitudinally extending cylindrical wall extending a greater radial distance from said central axis relative to said first longitudinally extending cylindrical wall.

31. A radiotelephone according to claim 30, said housing further including a 50 ohm signal feed portion, wherein when said antenna is in the extended position, said integrated matching circuit is electrically activated by contact with said signal feed portion to match the increased impedance attributed thereto.

32. A radiotelephone according to claim 31, said antenna further comprising a conducting end portion opposing said outwardly extending portion of said antenna, wherein when said integrated matching circuit is activated by contact between said conducting end portion and said housing signal feed portion.

33. A radiotelephone according to claim 32, wherein said signal feed portion defines a portion of said passage inner wall, and wherein said antenna further comprising a conducting portion disposed longitudinally upwardly apart from said conducting end, an wherein when said antenna is in a retracted position, said conducting portion engages with said housing signal feed portion.

34. A radiotelephone according to claim 33, wherein when said antenna is in the retracted position said antenna is configured to disconnect reactive components of said integrated matching circuit thereby enabling a broader radiotelephone operational bandwidth.

35. A radiotelephone according to claim 33, said antenna first and second ends having a substantially constant outer surface defined therebetween, wherein said antenna outer surface is formed of a non-conducting substrate material intermediate of said conducting portions, and wherein said first end is extendable out of said housing and said second end is non-extendable out of said housing.

36. A radiotelephone antenna assembly, comprising:

a retractable antenna translatable between extended and retracted positions, said retractable antenna having a top load electrical end and an opposing conducting end portion and defining a central axis therebetween and comprising an insulated cylindrical center conductor, said cylindrical insulated center conductor is positioned intermediate said antenna opposing ends such that it is in electrical communication with each of said top load and opposing conductive end portion when said antenna is extended; and a radiotelephone housing having an antenna passage with an inner wall positioned at a top portion of said housing adapted to receive said antenna, said inner wall comprising a longitudinally extending cylindrical ground portion having a first length and a spatially separated longitudinally extending signal conductive portion having a second length, wherein at least a portion of the length of said signal portion is positioned along said passage inner wall so as to contact said antenna as it translates within said passage, and wherein said antenna extends and retracts through said antenna passage such that a major portion of said antenna extends in said housing below said passage when said antenna is retracted; and wherein said antenna insulated cylindrical center conductor and said housing passage define a coaxial capacitor therebetween when said antenna is extended, said coaxial capacitor having opposing inner and outer conductive plates and an intermediate insulator, and wherein said antenna insulated cylindrical center conductor defines said inner plate and insulator portions of said coaxial capacitor and said passage ground cylindrical portion defines said outer plate of said coaxial capacitor.

37. A radiotelephone antenna assembly according to claim 36, wherein said antenna cylindrical insulated center conductor is a longitudinally extending central conductive element surrounded by an insulating dielectric layer, said central conductive element connected with the electrical load of said antenna, and wherein said said cylindrical around portion is a cylindrical ground clip which includes longitudinally extending first and second lengths, said first length defining an upper portion of said passage inner wall and said second length is spaced-apart from said passage inner wall, wherein when said antenna is extended, said integrated capacitor is defined by the transverse alignment of said antenna cylindrical insulated center conductor and said ground clip.

38. A radiotelephone antenna assembly according to claim 37, said housing further including a 50 Ohm signal feed portion which is in electrical communication with the lower portion of said passage inner wall, wherein when said antenna is in the extended position, said coaxial capacitor is electrically activated to match the increased impedance attributed thereto.

39. A radiotelephone antenna assembly according to claim 38, wherein said coaxial capacitor is activated by contact between said conducting end portion of said antenna and said housing signal feed portion, and wherein said antenna insulated center conductor is positioned on said longitudinally antenna spaced-apart a predetermined distance from said antenna conducting end portion, the predetermined distance corresponding to the distance between the ground and signal portions of said housing passage inner wall so that, in operation, said antenna insulated center conductor is transversely aligned with said ground first cylindrical portion when said conducting end portion is aligned with said housing signal feed portion when said antenna is extended.

40. A radiotelephone antenna assembly according to claim 36, wherein said antenna includes an inductor element formed around a predetermined portion of the non-conducting antenna material intermediate of said antenna top load and opposing end portion.

* * * * *

UNITED STATES PATENT AND TRADEMARK OFFICE

CERTIFICATE OF CORRECTION

PATENT NO. : 6,016,431

DATED : January 18, 2000

INVENTOR(S) : Howard Eugene Holshouser

It is certified that error appears in the above-identified patent and that said Letters Patent is hereby corrected as shown below:

Column 8, Claim 10, Line 53 insert -- , -- after inductor.

Column 10, Claim 28, Line 60, insert -- , -- after passage.

Column 11, Claim 29, Line 18, correct "around" to read – ground--.

Column 11, Claim 33, Line 42 correct "an" to read – and --.

Column 12, Claim 36, Line 32 correct "around" to read – ground--.

Signed and Sealed this

Sixteenth Day of January, 2001

*Attest:*

Q. TODD DICKINSON

*Attesting Officer*

*Commissioner of Patents and Trademarks*

UNITED STATES PATENT AND TRADEMARK OFFICE

CERTIFICATE OF CORRECTION

PATENT NO. : 6,016,431
DATED : January 18, 2000
INVENTOR(S) : Holshouser

It is certified that error appears in the above-identified patent and that said Letters Patent is hereby corrected as shown below:

Title page,
Item [56], References Cited, Patent no. 5,754,141 should be corrected to read -- 5,654,141 --.

Signed and Sealed this

Twenty-third Day of July, 2002

*Attest:*

JAMES E. ROGAN

*Attesting Officer* *Director of the United States Patent and Trademark Office*